US007167906B2

(12) United States Patent
Takenaga

(10) Patent No.: US 7,167,906 B2
(45) Date of Patent: Jan. 23, 2007

(54) INFORMATION COMMUNICATIONS SYSTEM, METHOD AND TERMINAL APPARATUS FOR EXECUTING AND APPROPRIATE PROCESS THAT CORRESPONDS TO THE USER AREA

(75) Inventor: Takashi Takenaga, Tokyo-to (JP)

(73) Assignees: Pioneer Corporation, Tokyo-to (JP); Increment P. Corporation, Tokyo-to (JP)

( * ) Notice: Subject to any disclaimer, the term of this patent is extended or adjusted under 35 U.S.C. 154(b) by 682 days.

(21) Appl. No.: 10/261,506

(22) Filed: Oct. 2, 2002

(65) Prior Publication Data

US 2003/0069971 A1 Apr. 10, 2003

(30) Foreign Application Priority Data

Oct. 5, 2001 (JP) ............................ P2001-309497

(51) Int. Cl.
*G06F 15/16* (2006.01)
(52) U.S. Cl. ...................... 709/219; 709/203; 709/217; 709/218
(58) Field of Classification Search ................ 340/905, 340/995.01; 455/414.3, 456, 456.5; 705/27; 709/203, 217, 218, 219
See application file for complete search history.

(56) References Cited

U.S. PATENT DOCUMENTS 6,014,090 A * 1/2000 Rosen et al. ................ 340/905
6,091,956 A * 7/2000 Hollenberg ............... 455/456.5
6,677,894 B2 * 1/2004 Sheynblat et al. ........ 455/414.3
6,741,188 B1 * 5/2004 Miller et al. ............. 340/995.1
6,954,735 B1 * 10/2005 Djupsjobacka et al. ....... 705/27
2002/0152266 A1 * 10/2002 Burfeind et al. ............ 709/203
2002/0155844 A1 * 10/2002 Rankin et al. .............. 455/456
2002/0184302 A1 * 12/2002 Prueitt et al. ............... 709/203

FOREIGN PATENT DOCUMENTS

| EP | 0 979 016 A1 | 2/2000 |
| JP | 05-232865 | 9/1993 |
| JP | 11-187469 | 7/1999 |
| WO | 99/45732 A1 | 9/1999 |

* cited by examiner

*Primary Examiner*—Rupal Dharia
*Assistant Examiner*—Quang N. Nguyen
(74) *Attorney, Agent, or Firm*—Sughrue Mion, PLLC

(57) ABSTRACT

In the information communication system wherein communication is performed between a server and a terminal apparatus via the Internet, the system includes an access server AS for recognizing an access point that has been used for a communication between the server and the terminal apparatus, and a www server that transmits information indicating the recognized access point with respect to the terminal apparatus, and the terminal apparatus includes a processing part for executing a control according to the information indicating the access point which has been transmitted on.

6 Claims, 3 Drawing Sheets

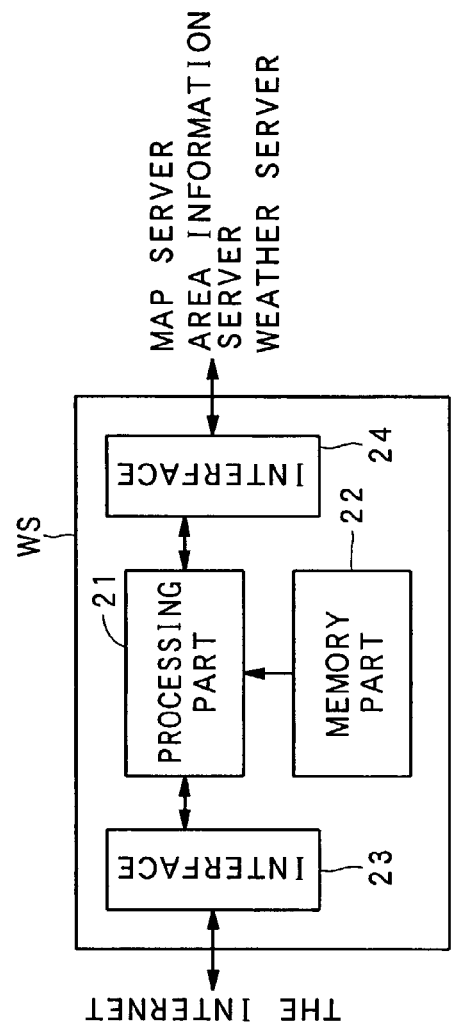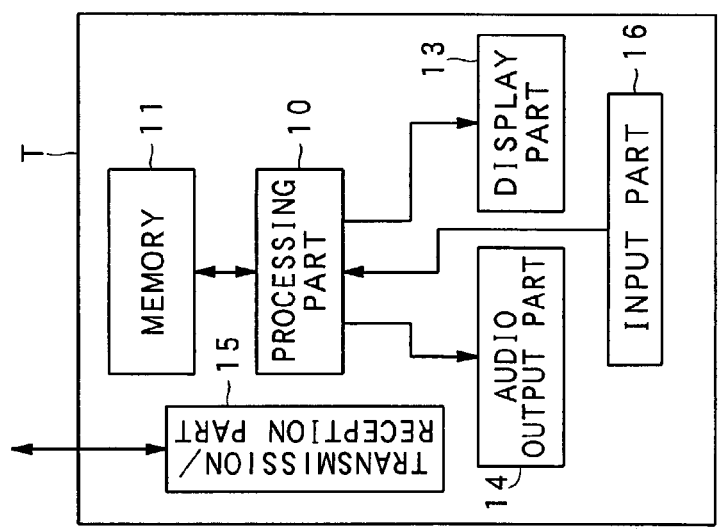

INFORMATION COMMUNICATIONS SYSTEM, METHOD AND TERMINAL APPARATUS FOR EXECUTING AND APPROPRIATE PROCESS THAT CORRESPONDS TO THE USER AREA

BACKGROUND OF THE INVENTION

1. Field of the Invention

The present invention relates to an information communication system for performing a communication between a server and a terminal apparatus via a communication network and, more particularly, relates to an information communication system which enables an appropriate process to be executed in the terminal apparatus.

2. Description of the Related Art

An information communication system is known which, using a portable terminal apparatus such as a portable telephone or PDA, procures map data, weather information, etc. from a server that is connected thereto via the Internet. A user who uses a terminal apparatus can limit, to a particular smaller area, the area regarding which he/she wants its map, its weather information, etc. to be displayed, by performing a prescribed operation according to the search screen image displayed on the terminal apparatus.

However, in a conventional information communication system, since it is constructed so that a search screen image may be displayed independently from the location of the terminal apparatus, there is at all times displayed a search screen image that is preset in the system or already set by the user. For example, when the user sets already the search screen image for the Kanto district as an initial search screen image for searching the map data, even when he/she uses the terminal apparatus in the Kansai district, the screen image for the Kanto district is first displayed. For this reason, when the user wants to see the map in the neighborhood of the current position, there exists the problem that the user needs to perform complicated manipulations until he/she procures necessary map data.

SUMMARY OF THE INVENTION

An object of the present invention is to provide an information communication system, information communication method, and terminal apparatus each of that enables the execution of an appropriate process that corresponds to the area where the user uses his/her terminal apparatus.

The above object of the present invention can be achieved by an information communication system. In one aspect of the present invention, there is provided an information communication system for performing a communication between a server and a terminal apparatus via a communication network, comprising: a recognizing device that recognizes an access point that has been used for the communication between the server and the terminal apparatus; and a transmitting device that transmits an information indicating the access point recognized by the recognizing device with respect to the terminal apparatus, and the terminal apparatus comprises a control device that executes control according to the information indicating the access point that has been transmitted by the transmitting device.

According to this aspect, the information indicating the recognized access point is transmitted toward the terminal apparatus, and the terminal apparatus executes control according to the information indicating the access point transmitted on by the transmitting device. Therefore, regardless of where the terminal apparatus is used, in the terminal apparatus the process that suits that area is at all times executed. Accordingly, the terminal apparatus can give the user necessary information without requiring the user to perform complicated manipulations.

In another aspect of the information communication system, wherein, the terminal apparatus includes a display device that displays a search screen image; and the control device controls the display device so as to display a search screen image corresponding to the information indicating the access point that has been transmitted by the transmitting device.

According to this aspect, since the search screen image that corresponds to the information indicating the access point that has been transmitted by the transmitting device is displayed, in the terminal apparatus, there is at all times displayed regardless of the area where the terminal is used the search screen image that suits that area.

In further aspect of the information communication system, wherein, the control device controls the display device so that a search screen image regarding the area in the neighborhood of the access point that has been transmitted by the transmitting device may be displayed.

In this aspect, regardless of the area where the terminal apparatus is used, in the terminal apparatus, there is at all times displayed the search screen image regarding that area.

The above object of the present invention can be achieved by an information communication method. In one aspect of the present invention, there is provided an information communication method for performing a communication between a server and a terminal apparatus via a communication network, comprising: a recognizing process of recognizing an access point that has been used for the communication between the server and the terminal apparatus; a transmitting process of transmitting with respect to the terminal apparatus information indicating the access point recognized in the recognizng process, and a control process of executing, in the terminal apparatus side, control according to the information indicating the access point that has been transmitted in the transmitting process.

According to this aspect, the information indicating the recognized access point is transmitted with respect to the terminal apparatus, and the terminal apparatus executes control according to the information indicating the access point that has been transmitted in the transmitting process. Therefore, regardless of the area where the terminal apparatus is used, in the terminal apparatus there is at all times executed a process that suits that area. Accordingly, the terminal apparatus can give the user necessary information without requiring him to perform complicated manipulations.

In another aspect of the information communication method, wherein, the terminal apparatus further comprises a display device that displays a search screen image; and in the control process, there is controlled the display device so that a search screen image corresponding to the information indicating the access point that has been transmitted in the transmitting process may be displayed.

According to this aspect, since the search screen image corresponding to the information indicating the access point that has been transmitted in the transmitting process is displayed, regardless of the area where the terminal apparatus is used, in the terminal apparatus, there is at all times displayed the search screen image that suits that area.

In further aspect of the information communication method, wherein, in the control process, the display device is controlled so that a search screen image regarding the area in the neighborhood of the access point that has been transmitted in the transmitting process may be displayed.

According to this aspect, regardless of the area where the terminal apparatus is used, in the terminal apparatus, there is at all times displayed the search screen image regarding that area.

The above object of the present invention can be achieved by a terminal apparatus. In one aspect of the present invention, there is provided a terminal apparatus being used in an information communication method for performing a communication between a server and the terminal apparatus via a communication network, the information communication method comprises a recognizing process of recognizing an access point that has been used for the communication between the server and the terminal apparatus; a transmitting process of transmitting with respect to the terminal apparatus information indicating the access point recognized in the recognizing process; and a control process of executing, in the terminal apparatus side, control according to the information indicating the access point that has been transmitted in the transmitting process, comprising: a control device that executes control according to the information indicating the access point that has been transmitted in the transmitting process.

According to this aspect, since it executes control according to the information indicating the access point that has been transmitted in the transmitting process, regardless of the area where the terminal apparatus is used, in the terminal apparatus there is at all times executed a process that suits that area. Accordingly, the terminal apparatus can give the user necessary information without requiring him to perform complicated manipulations.

In another aspect of the terminal apparatus, wherein, the terminal apparatus further comprises a display device that displays a search screen image, and the control device controls the display device so that the search screen image corresponding to the information indicating the access point that has been transmitted in the transmitting process may be displayed.

According to this aspect, since the search image corresponding to the information indicating the access point that has been transmitted in the transmitting process is displayed on the screen, regardless of the area where the terminal apparatus is used, in the terminal apparatus, there is at all times displayed on the screen the search image that suits that area.

In further aspect of the terminal apparatus, wherein, the control device controls the display device so that the search screen image regarding the area in the neighborhood of the access point that has been transmitted in the transmitting process may be displayed.

According to the above aspect, regardless of the area where the terminal apparatus is used, in the terminal apparatus there is at all times displayed on the screen the search image regarding that area.

BRIEF DESCRIPTION OF THE DRAWINGS

FIG. 2A is a block diagram illustrating respective constructions of a terminal apparatus;

FIG. 2B is a block diagram illustrating respective constructions of a www server, respectively.

DESCRIPTION OF THE PREFERRED EMBODIMENTS

Next, an embodiment of the present invention will be explained with reference to the drawings.

It is to be noted that the embodiment which will be explained below is the one wherein the present invention has been applied to an information communication system comprising a portable terminal apparatus such as a portable telephone or PDA (Personal Digital Assistant), a server that is connected to the terminal apparatus via a network such as the Internet, and the network.

Figure 1:
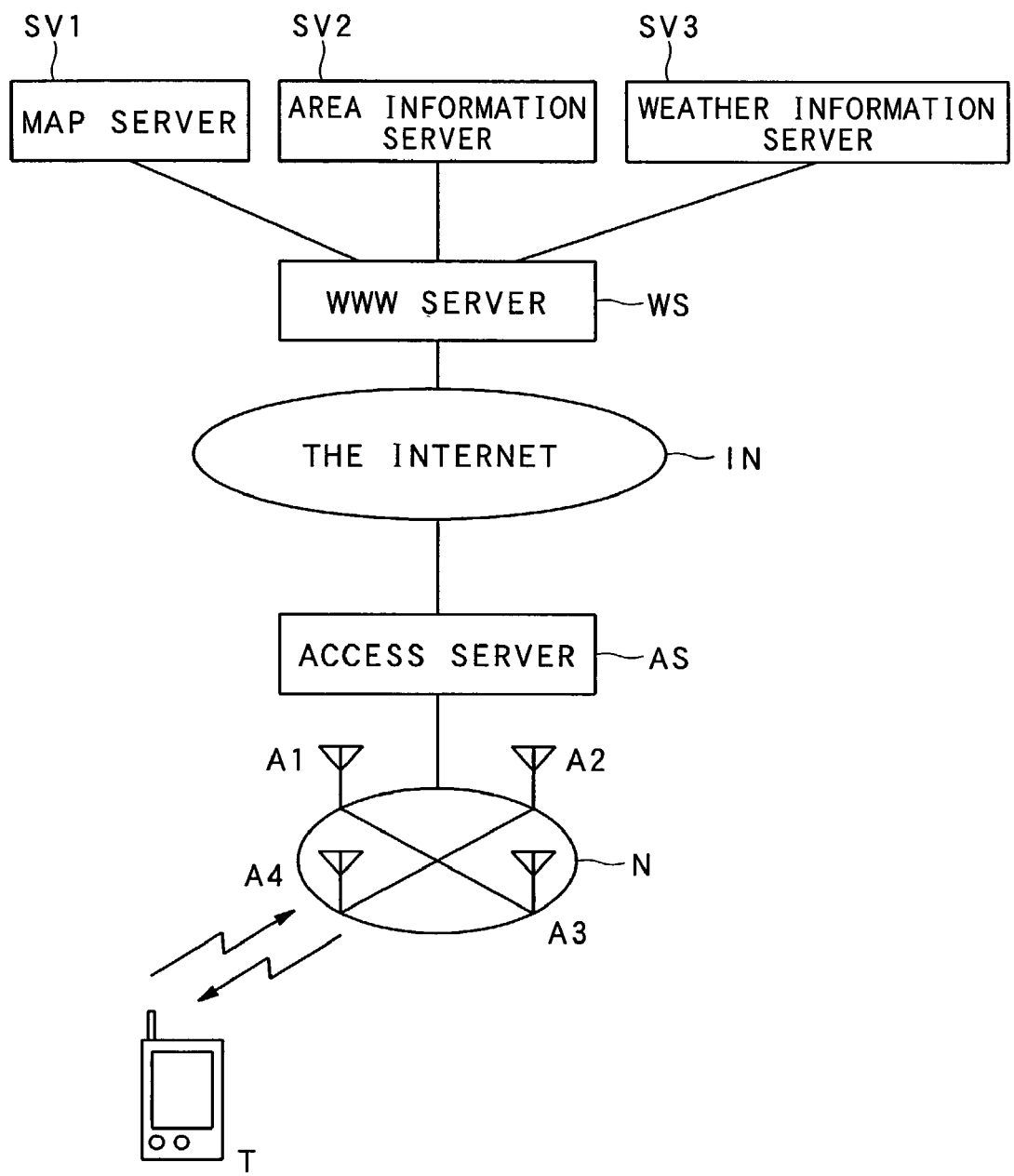
FIG. 1 is a block diagram illustrating the entire construction of an information communication system according to an embodiment of the present invention.

FIG. 1 is a block diagram illustrating the entire construction of an information system according to the present invention; and FIGS. 2A and 2B are block diagrams respectively illustrating the constructions of the terminal apparatus and a www server.

As illustrated in FIG. 1, the information communication system according to this embodiment comprises a map server SV1 for storing map data, an area information server SV2 for storing area information, a weather information server SV3 for storing weather information, a www server WS to that there are connected the map server SV1, area information server SV2, and weather information server SV3, a mobile body communication network for connecting antennas A1 to A4 within a prescribed area, access servers AS each provided for a corresponding one of the mobile body communication network, and a terminal apparatus T that is connected to any one of the antennas A1 to A4. The www server WS and the access server AS each are connected to the Internet.

As illustrated in FIG. 2A, the terminal apparatus T comprises a processing part 10 constructed of a CPU, a memory device, etc., a memory 11 for temporarily storing data, etc., a display part 13 for displaying information with respect to the user by means of an image, an audio output part 14 for providing information with respect to the user by means of a sound, a transmission/reception part 15 for executing transmission/reception processing of information that includes interface processing between the terminal apparatus and the Internet IN, and an input part 16 for accepting the user's input operation.

As illustrated in FIG. 2B, the www server WS comprises a processing part 21 constructed of a CPU, a memory device, etc., a memory 22 for temporarily storing respective data items, an interface 23 for executing transmission/reception of information between the www server WS and the Internet IN, and an interface 24 for executing transmission/reception of information between the www server WS and each of a map server SV1, an area information server SV2, and a weather information server SV3.

Figure 3:
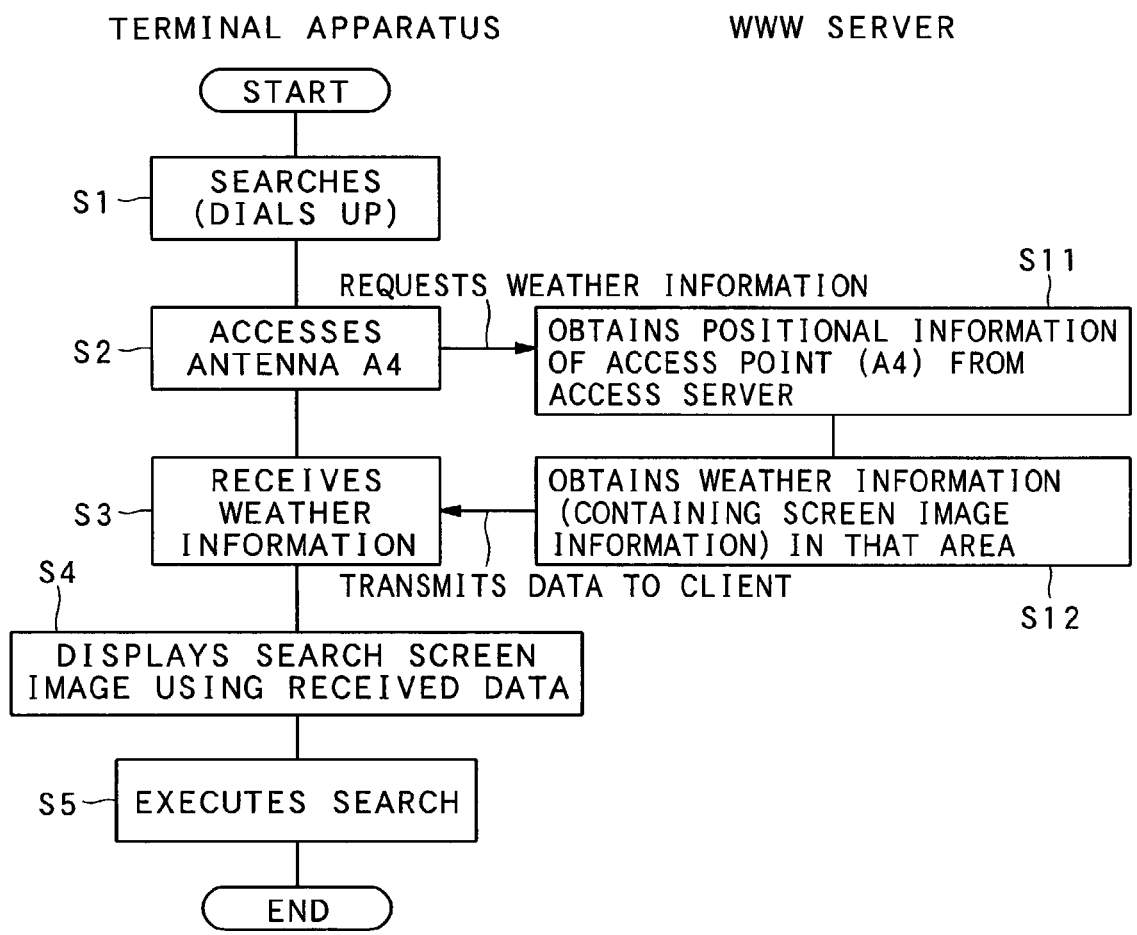
FIG. 3 is a flow chart illustrating the process when executing a process of searching for weather information.

Next, with reference to FIG. 3, the operation of the information communication system according to the present invention will be explained. FIG. 3 is a flow chart illustrating a process that is executed when executing search processing for weather information. Steps S1 to S5 in FIG. 3 show processes in the terminal apparatus T while steps S11 and S12 show processes in the www server WS. The processes in the terminal apparatus T and the processes in the www server WS are respectively executed in the processing part 10 and in the processing part 21.

At step S1, dial-up is executed. This processing is started when the input part 16 of the terminal apparatus T has accepted a prescribed operation. Next, at step S2, accessing the antenna A4 via the transmission/reception part 15 is executed. Incidentally, in this example, reference is made to a case where the terminal apparatus T has access to the antenna A4 and performs transmission/reception of information via the antenna A4.

When transmission/reception of information via the antenna A4 becomes possible and the terminal apparatus T is connected to the Internet IN via the mobile body communication network N and the access server AS, weather information is requested from the terminal apparatus T with respect to the www server WS via the Internet. As illustrated at step S11, upon receipt of this request, the www server WS gets from the access server AS via the Internet IN the position information indicating that the access point for the terminal apparatus T, from which that request is sent out, is the antenna A4. Next, as illustrated at step S12, the www server WS makes a communication with the weather information server SV3 via the interface 24, and gets from the weather information server SV3 the weather information in the area where the antenna A4 is installed. This weather information contains therein screen image information such as a search screen image to be displayed on the display part 13 of the terminal apparatus T. In this case, the search screen image is constructed so that the weather information as to the corresponding area can be easily searched for.

Subsequently, the www server WS transmits the weather information it has gotten from the weather information server S3 with respect to the corresponding terminal apparatus T, and transmits that information via the Internet IN to the terminal apparatus T.

As illustrated at step S3, in the terminal apparatus T, it receives the weather information that has been sent out from the www server WS. The weather information thus received is stored in the memory 11. Next, at step S4, according to the image information of the search screen image contained in the received weather information, a search screen image is displayed in the display part 13. This search screen image is the one which prompts the user to input, via the input part 16, the area regarding which he/she wants to get information about the weather, display items, etc. As illustrated at step S5, when the user performs his/her prescribed operation with respect to the input part according to the display made on the search screen, the search processing according to that operation is executed. Thereby, the information corresponding to the user's instruction is displayed on the display part 13, whereby the series of steps of processing are terminated. At this time, the information to be displayed on the display part 13 is read in from the weather information stored in the memory 11 according to the necessity, namely this latter information is thus utilized for display.

In this way, in the information communication system according to this embodiment, the weather information in the area where there is installed, for example, the antenna A4, which is the access point of the terminal apparatus T, is transmitted from the www server WS with respect to the terminal apparatus T (step S12). In the terminal apparatus T, it receives this weather information (step S3) and makes a display of the search image on the screen according to the image information contained in this weather information (step S4).

For this reason, regardless of the current position at which the terminal apparatus T is located, the weather information in the area in the neighborhood of the terminal apparatus T can be obtained. In addition, in the terminal apparatus T, there is displayed a search screen image for searching for the weather information in this area. Accordingly, when the user wants to see the map in the neighborhood of the current position, he/she can easily procure necessary map data. Also, since in this embodiment only the weather information alone in the area in the neighborhood of the terminal apparatus T is transmitted with respect to the terminal apparatus T, the amount of data to be transmitted decreases. Therefore, it is possible to decrease the communication cost and at the same time to shorten the length of communication time.

Although in the above-described embodiment illustration has been made of the case where weather information is requested, the present invention can be also applied to other information including map information, area information, etc. Namely, no limitation is imposed upon the contents of the information that can be handled.

As has been described above, according to the information communication system according to the present invention, the information indicating the recognized access point is transmitted with respect to the terminal apparatus, and the terminal apparatus executes control according to the access point that has been transmitted by the transmitting device. Therefore, regardless of the area where the terminal apparatus is used, in the terminal apparatus there is at all times executed a process that is appropriate to that area. Accordingly, it is possible to provide necessary information without requiring the user to perform complicated manipulations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-309497 filed on Oct. 5, 2001 including the specification, claims, drawings and summary is incorporated herein by reference in its entirety

What is claimed is:

1. An information communication system for performing a communication between a server and a terminal apparatus via a communication network, comprising:
   a recognizing device that recognizes an access point that has been used for the communication between the server and the terminal apparatus; and
   a transmitting device that transmits an information indicating the access point recognized by the recognizing device with respect to the terminal apparatus,
   wherein the terminal apparatus comprises a control device that executes control according to the information indicating the access point that has been transmitted by the transmitting device,
   wherein the information indicating the access point is weather information of a neighborhood corresponding to the access point, the weather information including a search screen image to be displayed in the terminal apparatus,
   wherein the terminal apparatus further comprises a displaying device that displays the search screen image; and
   a searching device that executes search processing regarding the weather information in accordance with a user's instruction based on the displayed search screen image,
   wherein the control device controls the displaying device so as to display the search screen image, and then displays the searched weather information after the search processing is executed.

2. The information communication system according to claim 1, wherein, the control device controls the display device so that a search screen image regarding the area in the neighborhood of the access point that has been transmitted by the transmitting device may be displayed.

3. An information communication method for performing a communication between a server and a terminal apparatus via a communication network, comprising:
   a recognizing process of recognizing an access point that has been used for the communication between the server and the terminal apparatus;
   a transmitting process of transmitting with respect to the terminal apparatus information indicating the access point recognized in the recognizing process, and
   a control process of executing, in the terminal apparatus side, control according to the information indicating the access point that has been transmitted in the transmitting process,
   wherein the information indicating the access point is weather information of a neighborhood corresponding to the access point, the weather information including a search screen image to be displayed in the terminal apparatus,
   wherein the method further comprises:
   a displaying process of displaying, in the terminal apparatus side, the search screen image;
   a searching process of executing, in the terminal apparatus side, search processing regarding the weather information in accordance with a user's instruction based on the displayed search screen image,
   wherein the control process executes control so as to display the search screen image, and then displays the searched weather information after the search processing is executed.

4. The information communication method according to claim 3, wherein the control process executes control so that a search screen image regarding the area in the neighborhood of the access point that has been transmitted in the transmitting process may be displayed.

5. A terminal apparatus being used in an information communication method for performing a communication between a server and the terminal apparatus via a communication network, the information communication method comprises a recognizing process of recognizing an access point that has been used for the communication between the server and the terminal apparatus; a transmitting process of transmitting with respect to the terminal apparatus information indicating the access point recognized in the recognizing process; and a control process of executing, in the terminal apparatus side, control according to the information indicating the access point that has been transmitted in the transmitting process, the terminal apparatus comprising:
   a control device that executes control according to the information indicating the access point that has been transmitted in the transmitting process,
   wherein the information indicating the access point is weather information of a neighborhood corresponding to the access point, the weather information including a search screen image to be displayed in the terminal apparatus,
   wherein the terminal apparatus further comprises a displaying device that displays the search screen image; and
   a searching device that executes search processing regarding the weather information in accordance with a user's instruction based on the displayed search screen image,
   wherein the control device controls the displaying device so as to display the search screen image, and then displays the searched weather information after the search processing is executed.

6. The terminal apparatus according to claim 5, wherein, the control device controls the display device so that the search screen image regarding the area in the neighborhood of the access point that has been transmitted in the transmitting process may be displayed.

* * * * *